United States Patent
Prasad et al.

(10) Patent No.: US 10,049,102 B2
(45) Date of Patent: Aug. 14, 2018

(54) METHOD AND SYSTEM FOR PROVIDING SEMANTICS BASED TECHNICAL SUPPORT

(71) Applicant: HCL Technologies Limited, Uttar Pradesh (IN)

(72) Inventors: Dhanyamraju S U M Prasad, Hyderabad (IN); Satya Sai Prakash K, Hyderabad (IN); Simy Chacko, Hyderabad (IN); Sekhar Ramaraju, Secunderabad (IN); Shiva Sholayyappan, Hyderabad (IN)

(*) Notice: Subject to any disclaimer, the term of this patent is extended or adjusted under 35 U.S.C. 154(b) by 54 days.

(21) Appl. No.: 15/379,925

(22) Filed: Dec. 15, 2016

(65) Prior Publication Data
US 2017/0132210 A1 May 11, 2017

Related U.S. Application Data

(63) Continuation-in-part of application No. 14/507,838, filed on Oct. 7, 2014, now abandoned.

(30) Foreign Application Priority Data

Jun. 26, 2014 (IN) ............... 3115/CHE/2014

(51) Int. Cl.
*G06F 17/27* (2006.01)
*G06F 17/30* (2006.01)
(Continued)

(52) U.S. Cl.
CPC .......... *G06F 17/2785* (2013.01); *G06F 11/07* (2013.01); *G06F 11/0748* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,839,853 | A | 6/1989 | Deerwester et al. |
| 6,289,353 | B1 | 9/2001 | Hazlehurst et al. |

(Continued)

OTHER PUBLICATIONS

Shivani Rao, Henry Medeiros, and Avinash Kak. "Comparing Incremental Latent Semantic Analysis Algorithms for Efficient Retrieval from Software Libraries for Bug Localization", Published in 2nd International Workshop on Software Mining, 8 pages, Nov. 11, 2013, Palo Alto, California.

*Primary Examiner* — Vu B Hang
(74) *Attorney, Agent, or Firm* — HM Law Group LLP; Vani Moodley, Esq.

(57) ABSTRACT

Disclosed is a system for providing semantics based technical support to a user. A keyword extraction module extracts a set of keywords from a plurality of knowledge content and a plurality of bug content. A matrix generation module generates a keyword-content matrix comprising a similarity score computed for each keyword corresponding to each knowledge content. The matrix generation module further decomposes the keyword-content matrix into one or more sub-matrices. A vector coordinates identification module determines a first set of vector coordinates for each knowledge content of the plurality of knowledge content and a second set of vector coordinates for a bug-query received from a user in real-time. A similarity measure module computes a cosine similarity measure of the bug-query with each knowledge content to identify at least one knowledge content relevant to the bug-query. The knowledge identification module further provides the at least one knowledge content to the user.

10 Claims, 8 Drawing Sheets

(51) Int. Cl.
*G06F 11/07* (2006.01)
*G06Q 50/00* (2012.01)

(52) U.S. Cl.
CPC ...... *G06F 11/0793* (2013.01); *G06F 17/3061* (2013.01); *G06F 17/30321* (2013.01); *G06F 17/30424* (2013.01); *G06Q 50/00* (2013.01); *G06F 17/274* (2013.01)

(56) References Cited

U.S. PATENT DOCUMENTS

| | | |
|---|---|---|
| 6,615,208 B1 | 9/2003 | Behrens et al. |
| 8,161,325 B2 | 4/2012 | Calman et al. |
| 8,713,021 B2 | 4/2014 | Bellegarda |
| 9,015,031 B2 | 4/2015 | Ferrucci et al. |
| 2010/0235164 A1 | 9/2010 | Todhunter et al. |

$$A = \begin{matrix} & D1 & D2 & D3 \\ & [1, & 0, & 0] \\ & [0, & 1, & 0] \\ & [0, & 1, & 0] \\ & [1, & 1, & 0] \\ & [0, & 1, & 0] \\ & [0, & 0, & 1] \\ & [0, & 1, & 1] \\ & [0, & 1, & 0] \\ & [0, & 1, & 1] \\ & [1, & 0, & 0] \\ & [1, & 1, & 1] \\ & [0, & 0, & 1] \\ & [0, & 0, & 1] \\ & [1, & 0, & 0] \\ & [0, & 0, & 1] \\ & [1, & 0, & 0] \end{matrix}$$

$$S = \begin{matrix} [[\ 3.37917633, & 0. & , & 0. & ], \\ [\ 0. & , & 2.32094165, & 0. & ], \\ [\ 0. & , & 0. & , & 2.04802275], \\ [\ 0. & , & 0. & , & 0. & ], \\ [\ 0. & , & 0. & , & 0. & ], \\ [\ 0. & , & 0. & , & 0. & ], \\ [\ 0. & , & 0. & , & 0. & ], \\ [\ 0. & , & 0. & , & 0. & ], \\ [\ 0. & , & 0. & , & 0. & ], \\ [\ 0. & , & 0. & , & 0. & ], \\ [\ 0. & , & 0. & , & 0. & ], \\ [\ 0. & , & 0. & , & 0. & ], \\ [\ 0. & , & 0. & , & 0. & ], \\ [\ 0. & , & 0. & , & 0. & ], \\ [\ 0. & , & 0. & , & 0. & ], \\ [\ 0. & , & 0. & , & 0. & ]] \end{matrix}$$

Figure 4(B)

$$V = \begin{matrix} [[-0.37435872, & -0.7256185\ , & -0.57735027], \\ [-0.81558342, & -0.03860509, & 0.57735027], \\ [\ 0.4412247\ , & -0.68701342, & 0.57735027]] \end{matrix}$$

Figure 4(C)

$$U \approx U_k = \begin{matrix} [[-0.11078402, -0.35140195], \\ [-0.21473236, -0.01663337], \\ [-0.21473236, -0.01663337], \\ [-0.32551637, -0.36803532], \\ [-0.21473236, -0.01663337], \\ [-0.17085532, 0.24875691], \\ [-0.38558768, 0.23212353], \\ [-0.21473236, -0.01663337], \\ [-0.38558768, 0.23212353], \\ [-0.11078402, -0.35140195], \\ [-0.4963717, -0.11927641], \\ [-0.17085532, 0.24875691], \\ [-0.17085532, 0.24875691], \\ [-0.11078402, -0.35140195], \\ [-0.17085532, 0.24875691], \\ [-0.11078402, -0.35140195]] \end{matrix}$$

$k = 2$ $$S \approx S_k = \begin{matrix}[[3.37917633, 0. \quad], \\ [0. \quad, 2.32094165]]\end{matrix}$$

$$V \approx V_k = \begin{matrix}[[-0.37435872, -0.7256185\ ], \\ [-0.81558342, -0.03860509], \\ [\ 0.4412247\ , -0.66701342]]\end{matrix}$$

Figure 5

METHOD AND SYSTEM FOR PROVIDING SEMANTICS BASED TECHNICAL SUPPORT

CROSS-REFERENCE TO RELATED APPLICATIONS

This application is a continuation-in-part application of U.S. patent application Ser. No. 14/507,838 filed on 7 Oct. 2014 and claiming priority from Indian Patent Application number 3115/CHE/2014 filed on 26 Jun. 2014, the disclosure of which is hereby incorporated by reference.

TECHNICAL FIELD

This invention relates to providing semantics based technical support, and more particularly to providing semantics based technical support based on available knowledge sources, prior code fixes and similarity of technical support issues.

BACKGROUND

Customer service is a very critical part in the service industry. The customer service may be provided in any sector such as a retail sector, an ecommerce sector, and a software development sector. Though there have been solutions in the retail sector and the ecommerce sector that facilitates to provide the customer service at satisfactory levels. However such solutions may not be feasible to provide the customer service, at the satisfactory level, in the software development sector as the queries in such sector are transient in nature and challenges are different when compared to the typical service industry. For example, the queries may be related to a software installation process, functional requirements and so on. In such a scenario, the queries tend to be persistent and probing. Providing adequate support to such queries, a customer executive should require considerable amount of time and knowledge to provide the customer service at satisfactory levels.

Though there exists some solution(s) in the existing art, specifically based on declarative semantics, to satisfy customer's queries. However, the declarative semantics based solutions may not be appropriate at all times as it may not be feasible for the declarative semantics based solutions to fetch relevant results pertaining to the queries.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for providing semantics based technical support to a user and the concepts are further described below in the detailed description. This summary is not intended to identify essential features of the claimed subject matter nor is it intended for use in determining or limiting the scope of the claimed subject matter.

In one implementation, a system for providing semantics based technical support to a user is disclosed. The system may comprise a processor and a memory coupled to the processor. The processor may execute a plurality of modules present in the memory. The plurality of modules may comprise a keyword extraction module, an indexing module, a matrix generation module, a vector coordinates identification module, a similarity measure module, and a knowledge identification module. The keyword extraction module may extract a set of keywords from a plurality of knowledge content and a plurality of bug content stored in a knowledge repository and a bug repository respectively. The indexing module may perform Latent Semantics Indexing (LSI) on the set of keywords, in order to index the set of keywords. The set of keywords may be indexed based on a set of predefined rules. The matrix generation module may generate a keyword-content matrix comprising a similarity score computed for each keyword, of the set of keywords, corresponding to each knowledge content present in the knowledge repository. In one aspect, the similarity score may indicate a frequency of occurrence pertaining to each keyword in each of the plurality of knowledge content. The matrix generation module may further decompose the keyword-content matrix into one or more sub-matrices. The keyword-content matrix may be decomposed based on a low-rank approximation method. The vector coordinates identification module may determine a first set of vector coordinates for each knowledge content of the plurality of knowledge content and a second set of vector coordinates for a bug-query received from a user in real-time. In one aspect, the second set of vector coordinates may be determined by performing the LSI on the bug-query. In one embodiment, the first set of vector coordinates and the second set of vector coordinates may be determined based on the one or more sub-matrices. The similarity measure module may compute a cosine similarity measure of the bug-query with each knowledge content stored in the knowledge repository. In one aspect, the cosine similarity may be computed based on the first set of vector coordinates and the second set of vector coordinates and a predefined formulation. The knowledge identification module may identify at least one knowledge content, from the knowledge repository, having the cosine similarity measure greater than a threshold value. The knowledge identification module may further provide the at least one knowledge content to the user thereby providing semantics based technical support to a user. Thus, based on the above, it may be understood that the Latent Semantics Indexing (LSI) method may help over declarative semantics as the LSI method provides the at least one knowledge content in response to the bug-query received from the user.

In another implementation, a method for providing semantics based technical support to a user is disclosed. In order to provide semantics based technical support, initially, a set of keywords may be extracted from a plurality of knowledge content and a plurality of bug content stored in a knowledge repository and a bug repository respectively. After extracting the set of keywords, Latent Semantics Indexing (LSI) may be performed on the set of keywords, in order to index the set of keywords. In one aspect, the set of keywords may be indexed based on a set of predefined rules. Subsequent to the indexing, a keyword-content matrix, may be generated, comprising a similarity score computed for each keyword, of the set of keywords, corresponding to each knowledge content present in the knowledge repository. In one aspect, the similarity score indicates a frequency of occurrence pertaining to each keyword in each of the plurality of knowledge content. After generating the keyword-content matrix, the keyword-content matrix may be decomposed into one or more sub-matrices. In one aspect, the keyword-content matrix may be decomposed based on a low-rank approximation method. Subsequently, a first set of vector coordinates may be determined for each knowledge content of the plurality of knowledge content and a second set of vector coordinates may be determined for a bug-query received from a user in real-time. The second set of vector coordinates may be determined by performing the LSI on the bug-query. In one aspect, the first set of vector coordinates and the second set of vector coordinates may be determined based on the one or more sub-matrices. Post identification of the first set of vectors and the second set of vectors, a cosine similarity measure of the bug-query may be computed with each knowledge content stored in the knowledge repository. The cosine similarity may be computed based on the first set of vector coordinates and the second set of vector coordinates and a predefined formulation. After computing the cosine similarity, at least one knowledge content, from the knowledge repository, having the cosine similarity measure greater than a threshold value may be identified. Thereafter the at least one knowledge content may be provided to the user thereby providing the semantics based technical support to the user. In one aspect, the aforementioned method for providing semantics based technical support may be performed by a processor using programmed instructions stored in a memory.

In yet another implementation, non-transitory computer readable medium embodying a program executable in a computing device for providing semantics based technical support to a user is disclosed. The program may comprise a program code for extracting a set of keywords from a plurality of knowledge content and a plurality of bug content stored in a knowledge repository and a bug repository respectively. The program may further comprise a program code for performing Latent Semantics Indexing (LSI) on the set of keywords, in order to index the set of keywords, wherein the set of keywords are index based on a set of predefined rules. The program may further comprise a program code for generating a keyword-content matrix comprising a similarity score computed for each keyword, of the set of keywords, corresponding to each knowledge content present in the knowledge repository, wherein the similarity score indicates a frequency of occurrence pertaining to each keyword in each of the plurality of knowledge content. The program may further comprise a program code for decomposing the keyword-content matrix comprising into one or more sub-matrices, wherein the keyword-content matrix is decomposed based on a low-rank approximation method. The program may further comprise a program code for determining a first set of vector coordinates for each knowledge content of the plurality of knowledge content and a second set of vector coordinates for a bug-query received from a user in real-time, wherein the second set of vector coordinates are determined by performing the LSI on the bug-query, and wherein the first set of vector coordinates and the second set of vector coordinates are determined based on the one or more sub-matrices. The program may further comprise a program code for computing a cosine similarity measure of the bug-query with each knowledge content stored in the knowledge repository, wherein the cosine similarity is computed based on the first set of vector coordinates and the second set of vector coordinates and a predefined formulation. The program may further comprise a program code for identifying at least one knowledge content, from the knowledge repository, having the cosine similarity measure greater than a threshold value. The program may further comprise a program code for providing the at least one knowledge content to the user thereby providing semantics based technical support to a user.

BRIEF DESCRIPTION OF DRAWINGS

The foregoing detailed description of embodiments is better understood when read in conjunction with the appended drawings. For the purpose of illustrating the disclosure, example constructions of the disclosure is shown in the present document; however, the disclosure is not limited to the specific methods and systems disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

FIG. 3 illustrates a matrix 'A', in accordance with an embodiment of the present subject matter.

FIG. 4(A) illustrates a matrix 'U', in accordance with an embodiment of the present subject matter.

FIG. 4(B) illustrates a matrix 'S', in accordance with an embodiment of the present subject matter.

FIG. 4(C) illustrates a matrix 'V', in accordance with an embodiment of the present subject matter.

FIG. 5 illustrates a first two columns of matrices 'U', and 'V', in accordance with an embodiment of the present subject matter.

DETAILED DESCRIPTION

Figure 1:
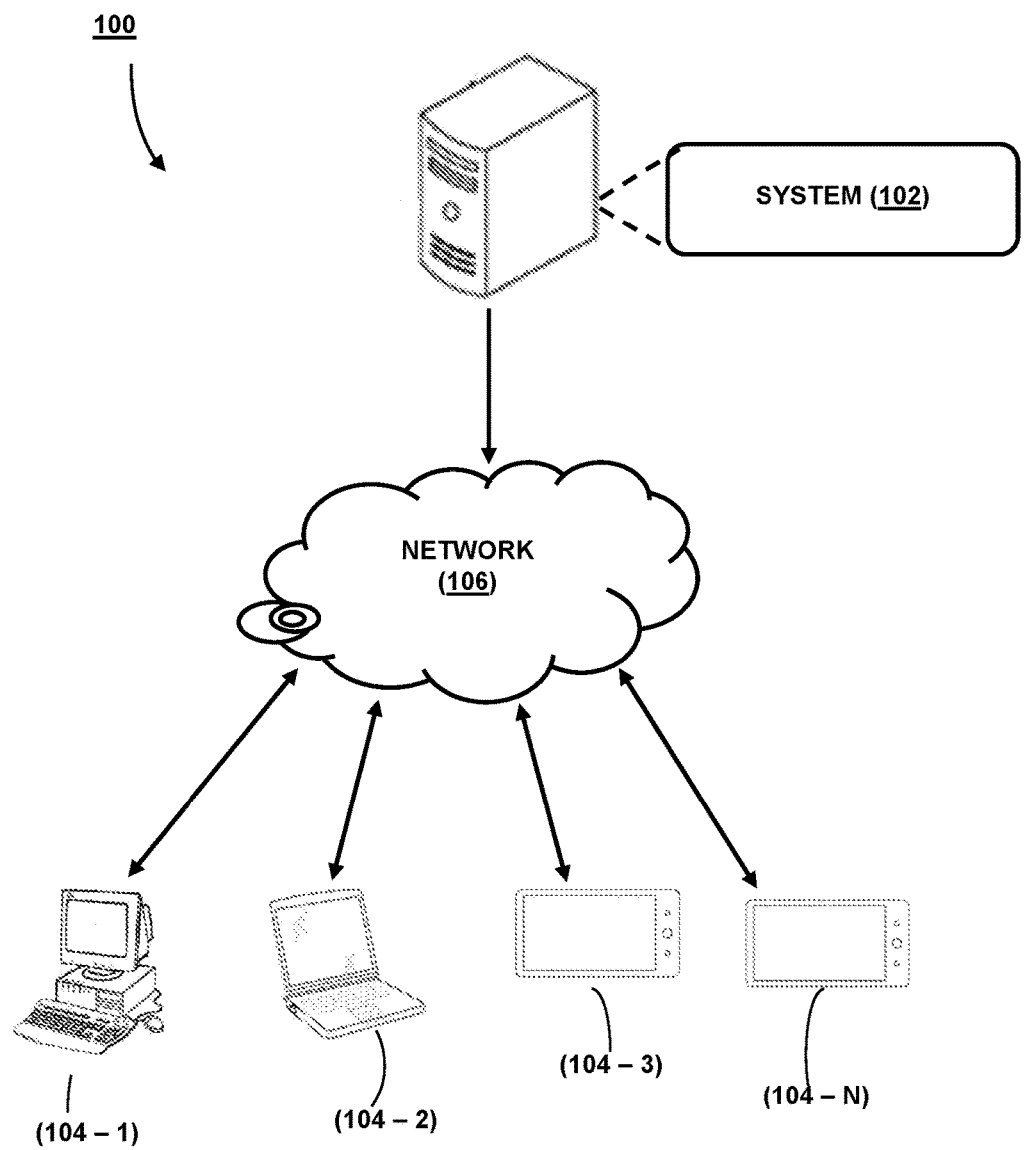
FIG. 1 illustrates a network implementation of a system for providing semantics based technical support to a user, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The embodiments herein disclose a method and system for providing semantics based technical support based on available knowledge sources and similarity of technical support issues. It may be understood that the technical support issues may be stored in a bug repository and knowledge may be stored in a knowledge repository storing. The bug repository may include, but not limited to, bugs/issues reported to an organization to, solutions to bugs/issues reported to the organization, bugs/issues reported to an organization who provides support to the same software/similar software and so on, solutions to bugs/issues reported to an organization who provides support to the same software/similar software and so on, bugs/issues reported in publicly available repositories (such as the internet), solutions to bugs/issues reported in publicly available repositories and so on.

The knowledge repository, on the other hand, may comprise documents (including, but not limited to, white papers, technical documents and so on) available in the organization, software code repositories and so on. It may be understood that the terms 'bug', 'issue' and 'query' have been used interchangeably hereinafter and may indicate a query, related to a software product, received from a user. The software product as disclosed herein may be a software product designed to run on a computing device (such as a computer, laptop, tablet, mobile phone and so on), embedded software or any other product which comprises of at least one software code.

In order to provide the semantics based technical support, initially, a set of keywords may be extracted from the plurality of bug content and the plurality of knowledge content. Subsequently, Latent Semantics Indexing (LSI) may be performed on the set of keywords in order to index the set of keywords. It may be understood that various synonyms, acronyms, and polysemy pertaining to each keyword may be considered while indexing the set keywords. After indexing the set of keywords, a keyword-content matrix may be generated. In one aspect, the keyword-content matrix comprises a similarity score computed for each keyword, of the set of keywords, corresponding to each knowledge content present in the knowledge repository. Post generation of the similarity score, the keyword-content matrix may be decomposed into one or more sub-matrices.

In one embodiment, the keyword-content matrix may be decomposed to determine a first set of vector coordinates, for each knowledge content of the plurality of knowledge content, and a second set of vector coordinates for a bug-query received from a user in real-time. In one aspect, the first set of vector coordinates and the second set of vector coordinates are plotted on a vector space to determine one or more knowledge content relevant for the bug-query received from the user in real-time. In order to determine the one or more knowledge content relevant for the bug-query, a cosine similarity measure of the bug-query with each knowledge content may be computed to identify at least one knowledge content, from the knowledge repository, having the cosine similarity measure greater than a threshold value. Based on the identification, the at least one knowledge may be provided to the user.

While aspects of described system and method for providing semantics based technical support to a user and may be implemented in any number of different computing systems, environments, and/or configurations, the embodiments are described in the context connected vehicles.

Referring now to FIG. 1, a network implementation 100 of a system 102 for providing semantics based technical support to a user is disclosed. In order to provide the semantics based technical support, initially, the system 102 extracts a set of keywords from a plurality of knowledge content and a plurality of bug content stored in a knowledge repository and a bug repository respectively. After extracting the set of keywords, the system 102 performs Latent Semantics Indexing (LSI) on the set of keywords, in order to index the set of keywords. Subsequent to the indexing, the system 102 generates a keyword-content matrix comprising a similarity score computed for each keyword, of the set of keywords, corresponding to each knowledge content present in the knowledge repository. After generating the keyword-content matrix, the system 102 decomposes the keyword-content matrix into one or more sub-matrices. Subsequently, the system 102 determines a first set of vector coordinates, for each knowledge content of the plurality of knowledge content, and a second set of vector coordinates, for a bug-query received from a user in real-time. Post determination of the first set of vectors and the second set of vectors, the system 102 computes a cosine similarity measure of the bug-query may be computed with each knowledge content stored in the knowledge repository. After computing the cosine similarity, the system 102 identifies at least one knowledge content, from the knowledge repository, having the cosine similarity measure greater than a threshold value. Thereafter the system 102 provides the at least one knowledge content may be provided to the user.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
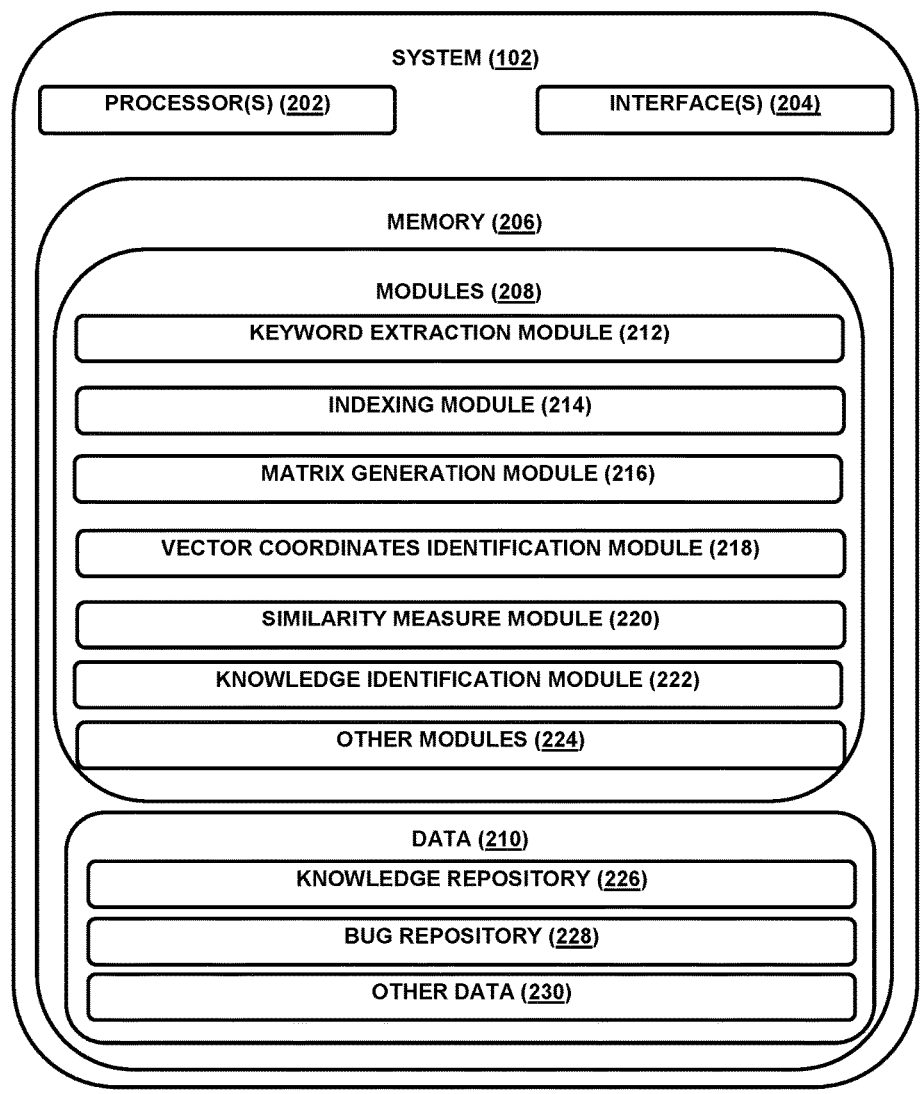
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a keyword extraction module 212, an indexing module 214, a matrix generation module 216, a vector coordinates determination module 218, a similarity measure module 220, a knowledge identification module 222, and other modules 224. The other modules 224 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a knowledge repository 226, a bug repository 228, and other data 230. The other data 230 may include data generated as a result of the execution of one or more modules in the other modules 224.

As there are various challenges observed in the existing art, the challenges necessitate the need to build the system 102 for providing semantics based technical support to a user. In order to provide the semantics based technical support, at first, a user may use the client device 104 to access the system 102 via the I/O interface 204. The user may register them using the I/O interface 204 in order to use the system 102. In one aspect, the user may access the I/O interface 204 of the system 102. The system 102 may employ the keyword extraction module 212, the indexing module 214, the matrix generation module 216, the vector coordinates determination module 218, the similarity measure module 220, and the knowledge identification module 222. The detail functioning of the modules are described below with the help of figures.

The embodiments herein disclose a method and system for providing semantics based technical support based on available knowledge sources and similarity of technical support issues. It may be understood that the technical support issues may be stored in a bug repository and knowledge may be stored in a knowledge repository storing. The bug repository may include, but not limited to, bugs/issues reported to an organization to, solutions to bugs/issues reported to the organization, bugs/issues reported to an organization who provides support to the same software/similar software and so on, solutions to bugs/issues reported to an organization who provides support to the same software/similar software and so on, bugs/issues reported in publicly available repositories (such as the internet), solutions to bugs/issues reported in publicly available repositories and so on.

The knowledge repository, on the other hand, may include, but not limited to, documents (including, but not limited to, white papers, technical documents and so on), software code repositories. It may be understood that the terms 'bug', 'issue' and 'query' have been used interchangeably hereinafter and may indicate a query, related to a software product, received from a user. Further it may be understood that the software product as disclosed herein may be a software product designed to executed on a computing device (such as a computer, laptop, tablet, mobile phone and so on), embedded software or any other product which comprises of at least one software code.

In order provide the semantics based technical support to the user, the keyword extraction module 212 extracts a set of keywords from the plurality of knowledge content and the plurality of bug content stored in the knowledge repository 226 and the bug repository respectively 228. The set of keywords may be extracted based on at least one of a frequency of occurrence, proximity between various keywords, synonyms, acronyms, and polysemy. Subsequent to the extraction of the set of keywords, the indexing module 214 performs Latent Semantics Indexing (LSI) on the set of keywords. In one aspect, the LSI may be performed to index the set of keywords. The set of keywords may be indexed based on a set of predefined rules. Examples of the set of rules may include, but not limited to, use of stop words, tokenization of text, lowercasing of text, and sorting of the set of keywords in alphabetical order. In one aspect, the LSI may be performed on the set of keywords by using one of decomposition methods including, but not limited to, a low rank approximation method, a dimensionality reduction method, and an Eigen vectors method.

Once the set of keywords are indexed by using the LSI, the matrix generation module 216 generates a keyword-content matrix. The keyword-content matrix comprises a similarity score computed for each keyword, of the set of keywords, corresponding to each knowledge content present in the knowledge repository 226. In one aspect, the similarity score indicates a frequency of occurrence pertaining to each keyword in each of the plurality of knowledge content. The matrix generation module 216 further decomposes the keyword-content matrix into one or more sub-matrices. In one embodiment, the keyword-content matrix may be decomposed based on a low-rank approximation method.

In order to elucidate the functioning of the aforementioned modules, consider an example where the knowledge repository 226 stores a plurality of documents namely '$D_1$', '$D_2$', and '$D_3$'. The title of the documents '$D_1$', '$D_2$', and '$D_3$' are 'MP4 video not playing on Windows10', 'Windows media player needs patch to play MP4', and 'VLC Player play all formats including MP4' respectively. From the above mentioned documents, the keyword extraction module 212 extracts keywords and thereby indexes the keywords by performing the LSI. For example, the keywords extracted are: 'MP4', 'video', 'not', 'playing', 'on', 'Windows10', 'media', 'player', 'needs', 'patch', 'to', 'play', 'VLC', 'all', 'formats', and 'including'.

After indexing the keywords, the matrix generation module 216 generates a keyword-content matrix (A), as shown in FIG. 3, comprising a frequency of occurrence pertaining to each keyword in each of the documents '$D_1$', '$D_2$', and '$D_3$'. In this specific example, the keyword-content matrix ($A_{t\times d}$) has 't'='16' and 'd'='3'. However, the keyword-content matrix ($A_{t\times d}$) may have values pertaining to 't' and 'd' up to '10000000' and '50000' respectively.

Figure 4A:
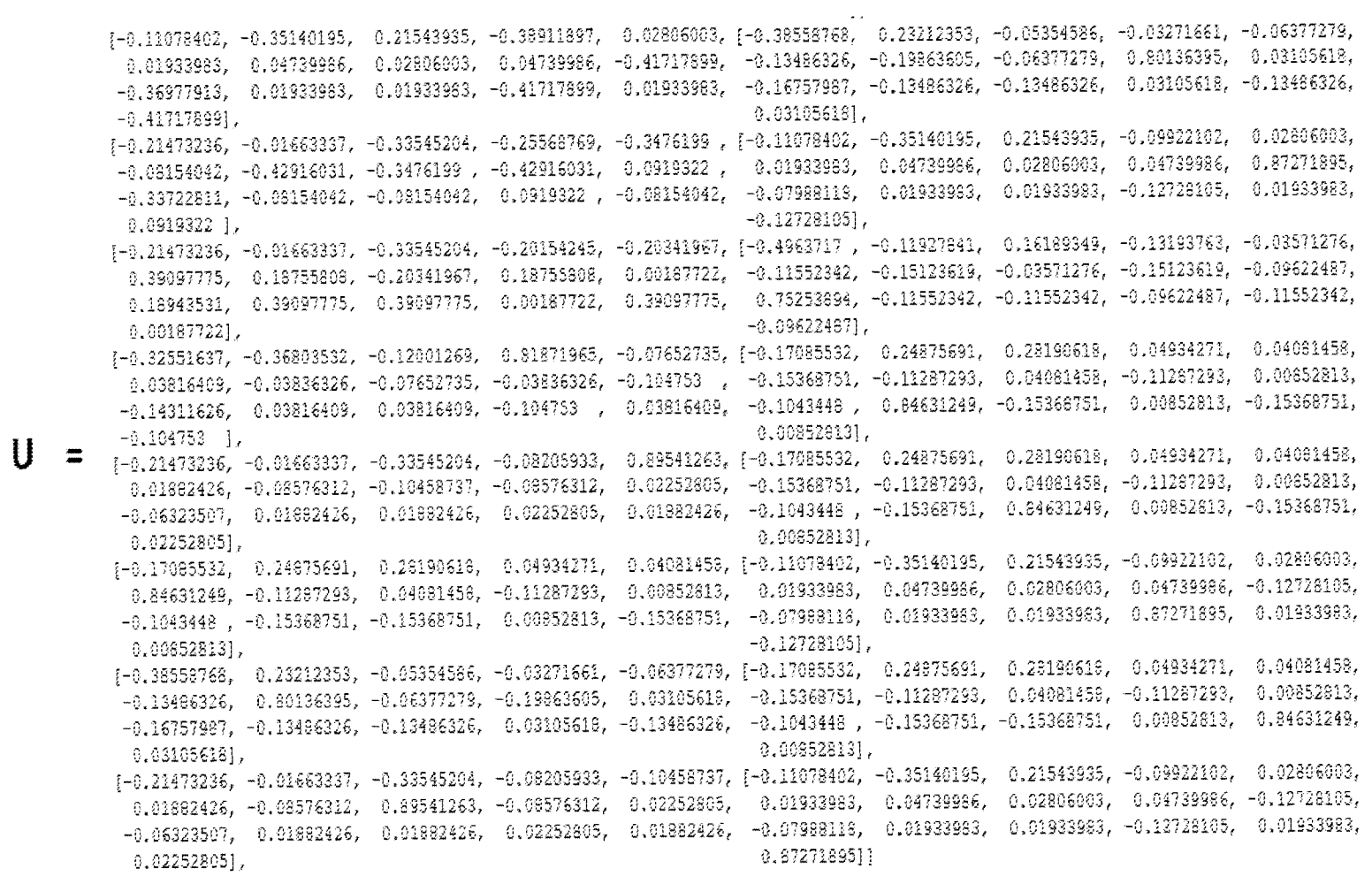

Subsequent to the generation of the keyword-content matrix (A), the matrix generation module 216 decomposes the keyword-content matrix (A) into three matrices. The three matrices are referred as 'U', 'S', and '$V^T$', wherein $A = USV^T$, as shown in FIGS. 4(A), 4(B), and 4(C) respectively.

It may be understood that the matrices 'U', 'S', and 'V' are computed by decomposing the keyword-content matrix $A_{t\times d}$ into the product of three matrices i.e. $U_{t\times n}$, $S_{n\times n}$, and $V_{d\times n}$.

$$A_{t\times d} = U_{t\times n}, S_{n\times n}, \text{ and } V_{d\times n} \quad (1)$$

where 't' is the number of keywords, 'd' is the number of documents, n=min (t,d), 'U' and 'V' have orthogonal columns i.e. $UU^T = D^T D = 1$, S=diag ($\sigma_1, \sigma_2, \ldots \sigma_n$), $\sigma_i > 0$ for $1 \le i \le r$, $\sigma_j = 0$ for $j \ge r+1$.

It may be understood that the matrices 'U', 'S', and 'V' can be viewed as a method for rotating the axes of the n-dimensional space such that the first axis runs along the direction of the largest variation among the documents, the second dimension runs along the direction with the second largest variation and so forth. The matrices 'U' and 'V' represent the keywords and the documents in the space respectively. The diagonal matrix 'S' contains the singular values of 'A' in the descending order. The $i^{th}$ singular value indicates the amount of variation along the $i^{th}$ axis.

By restricting the matrices 'U', 'S', and '$V^T$' to their first k<n rows, the matrices $U_{t\times n}$, $S_{n\times n}$, and $(V_{d\times n})^T$ may be obtained. After obtaining $U_{t\times n}$, $S_{n\times n}$, and $(V_{d\times n})^T$ matrices, a Rank 2 Approximation (where 'k'=2) may be performed, on the $U_{t\times n}$, $S_{n\times n}$, and $(V_{d\times n})^T$ matrices, keeping the first two columns of 'U' and 'V' and the first two columns and rows of 'S', as shown in FIG. 5.

After decomposing the keyword-content matrix (A), the vector coordinates determination module 218 determines a first set of vector coordinates and a second set of vector coordinates. The first set of vector coordinates may be determined for each knowledge content of the plurality of knowledge content. The second set of vector coordinates, on the other hand, may be determined for a bug-query received from a user in real-time. In one aspect, the second set of vector coordinates may be determined by performing the LSI on the bug-query. It may be understood that the first set of vector coordinates and the second set of vector coordinates may be determined based on the one or more sub-matrices.

After determining the first set of vector coordinates and the second set of vector coordinates, the similarity measure module 220 computes a cosine similarity measure of the bug-query with each knowledge content stored in the knowledge repository. The cosine similarity may be computed based on the first set of vector coordinates and the second set of vector coordinates and a predefined formulation. Upon computing the cosine similarity, the knowledge identification module 222 identifies at least one knowledge content, from the knowledge repository 226, having the cosine similarity measure greater than a threshold value. The knowledge identification module 222, upon identification of the at least one knowledge content, further provides the at least one knowledge content to the user thereby providing semantics based technical support to a user.

In order to elucidate the functioning of the aforementioned modules, consider the example same as above mentioned. The vector coordinates determination module 218 determines the first set of vector coordinates in the 2-dimensional vector space. Based on the abovementioned matrices 'U', 'S', and 'V', rows of 'V' holds eigen vector values. The first set of vector coordinates pertaining to each document '$D_1$', '$D_2$', and '$D_3$' are determined as:

$D_1$ (−0.37436, −0.72562), $D_2$ (−0.81558, −0.0386), and $D_3$ (0.44122, −0.68701)

Figure 6:
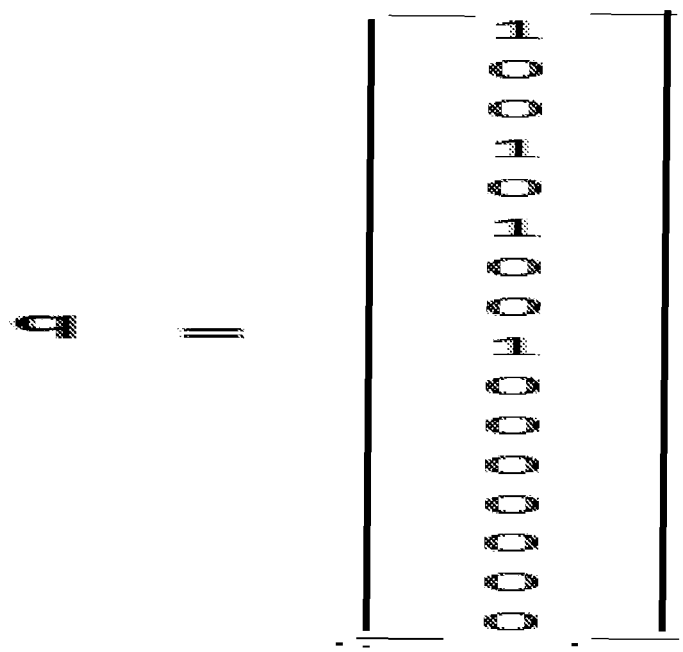
FIG. 6 illustrates a matrix (q) indicating a query received from a user, in accordance with an embodiment of the present subject matter.

As and when a query is received from the user, the vector coordinates identification module 218 determines the second set of vector coordinates for the query. In order to better understand, consider a query received as "gold silver truck". Upon receipt of the query, the keyword extraction module 212 extracts 'gold' 'silver', and 'truck' as a set of keywords from the query. Upon extraction, the indexing module 214 performs the LSI on the set of keywords in order to index the set of keywords and thereby the matrix generation module 216 generates a query matrix (q), as shown in FIG. 6, for the query based on the keyword-content matrix.

Subsequently, the vector coordinates identification module 218 determines the second set of vector coordinates for the query based on 'U', 'S', and 'V' matrices. It may be understood that the second set of vector coordinates may be determined based on $$q = q^T U_k S_k^{-1} \quad (2)$$

Thus, based on the equation (2), the query matrix (q), 'U' matrix and 'S' matrix and considering the 'k'=2, the vector coordinates determination module 218 determines the second set of vector coordinates for the query as q (newq)=[−0.29378 −0.10278], as shown below, using a programming construct.

$q$=np.asarray ([1,0,0,1,0,1,0,0,1,0,0,0,0,0,0,0])

$S_k^{-1}$=linalg.inv ($S_k$)

new$q$=np.dot ($q$, np.dot ($U_k, S_k^{-1}$))

Once the first set of vector coordinates and the second set of vector coordinates are determined, the similarity measure module 220 computes the cosine similarity measure of the query with document '$D_1$', '$D_2$', and '$D_3$'. The predefined formulation used for computing the cosine similarity measure is:

$$\text{sim}(q,d) = (q.d)/|q||d| \quad (3)$$

Based on the equation (3), the cosine similarity measure may be computed for the query with each knowledge content (document '$D_1$', '$D_2$', and '$D_3$') stored in the knowledge repository 226.

Using the programming construct, the cosine similarity measure for the query (q) and the document '$D_1$' is found to be '0.72625', wherein the similarity measure for the query (q) pertaining to the document '$D_1$' is computed by $D_1$=dot (new$q$, $D_1.T$)/linalg.norm(new$q$)*linalg.norm ($D_1$)

Similarly, the cosine similarity measure for the query and the document '$D_2$' is found to be '0.958456', wherein the similarity measure for the query (q) pertaining to the document '$D_2$' is computed by $$D_2 = \text{dot}(\text{new}q, D_2.T)/\text{linalg.norm}(\text{new}q)*\text{linalg.norm}(D_2)$$

Similarly, the cosine similarity measure for the query and the document 'D$_3$' is found to be '−0.2322', wherein the similarity measure for the query (q) pertaining to the document 'D$_3$' is computed by $$D_3 = \text{dot}(\text{new}q, D_3.T)/\text{linalg.norm}(\text{new}q)*\text{linalg.norm}(D_3)$$

Once the cosine similarity measure is computed for the query with each knowledge content (document 'D$_1$', 'D$_2$', and 'D$_3$'), the knowledge identification module 222 identifies the document 'D$_2$' as most relevant amongst the other two documents D$_3$ and D$_1$, as the document 'D$_2$' has the highest cosine similarity measure of the query amongst the documents 'D$_1$', 'D$_2$', and 'D$_3$'. Thus, the knowledge identification module 222 provides the document 'D$_2$' to the user thereby providing the semantics based technical support to the user.

In the above example, the Rank 2 Approximation may be performed keeping the first two columns of 'U' and 'V' and the first two columns and rows of 'S'. However the rank approximation may be performed for any number of rows and columns. Typically the Rank Approximation may be performed on the keyword-content matrix with the rank ranging between 100 to 300.

In one embodiment, a result provided to the user for each bug-query received is mapped and stored for future reference. This mapping of the result with a bug-query may be referred, whenever a new bug-query is identical to a previously received bug-query, and the result may be fetched and provided to the user accordingly. In other words, the knowledge content, provided for the bug-query, is maintained in the bug repository 226. It may be understood that the bug repository 226 is maintained to provide the at least one knowledge content when a new bug-query, identical to any of a previous bug-query, is received from any user in the past. Further it may be understood that when the new bug-query is not identical to any of a previous bug and/or query, the bug repository 226 may be updated with the mapping of the at least one knowledge content provided for the new bug-query. The mapping stored may facilitate the system 102 to provide the at least one knowledge content, through a suitable interface such as an email, a pop-up, a widget, a chat message, a recording and so on.

Figure 7:
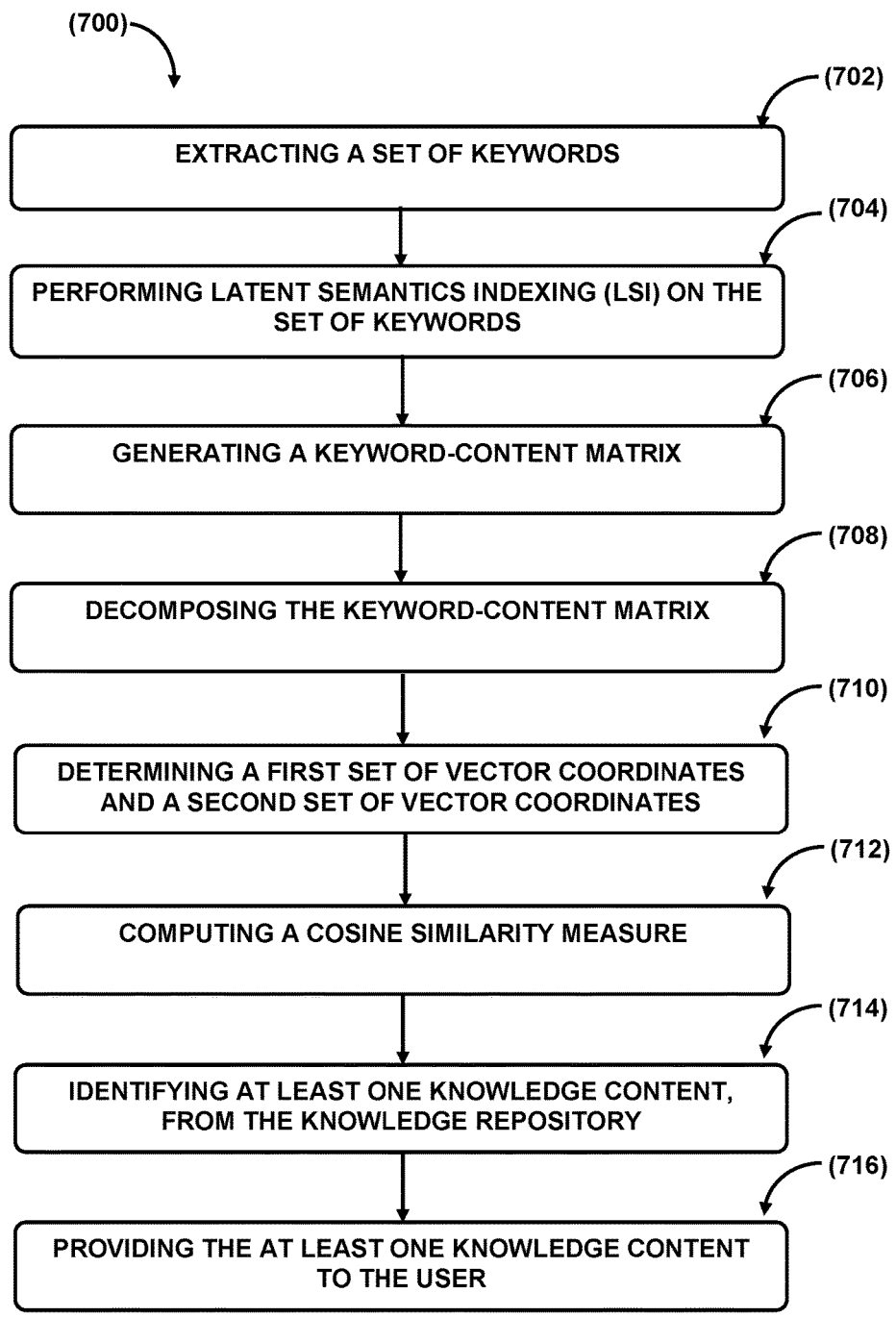
FIG. 7 illustrates a method for providing the semantics based technical support to the user, in accordance with an embodiment of the present subject matter.

Referring now to FIG. 7, a method 700 for providing semantics based technical support to a user is shown, in accordance with an embodiment of the present subject matter. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including memory storage devices.

The order in which the method 700 is described is not intended to be construed as a limitation, and any number of the described method blocks can be combined in any order to implement the method 700 or alternate methods. Additionally, individual blocks may be deleted from the method 700 without departing from the spirit and scope of the subject matter described herein. Furthermore, the method can be implemented in any suitable hardware, software, firmware, or combination thereof. However, for ease of explanation, in the embodiments described below, the method 700 may be considered to be implemented as described in the system 102.

At block 702, a set of keywords may be extracted from a plurality of knowledge content and a plurality of bug content stored in a knowledge repository and a bug repository respectively. In one implementation, the set of keywords may be extracted by the keyword extraction module 212.

At block 704, the set of keywords may be indexed by performing Latent Semantics Indexing (LSI). In one aspect, the set of keywords may be indexed based on a set of predefined rules. In one implementation, the set of keywords may be indexed by the indexing module 214.

At block 706, a keyword-content matrix may be generated. In one aspect, the keyword-content matrix comprises a similarity score computed for each keyword, of the set of keywords, corresponding to each knowledge content present in the knowledge repository 226. In one aspect, the similarity score may indicate a frequency of occurrence pertaining to each keyword in each of the plurality of knowledge content. In one implementation, the keyword-content matrix may be generated by the matrix generation module 216.

At block 708, the keyword-content matrix may be decomposed into one or more sub-matrices. In one aspect, the keyword-content matrix may be decomposed based on a low-rank approximation method. In one implementation, the keyword-content matrix may be decomposed by the matrix generation module 216.

At block 710, a first set of vector coordinates and a second set of vector coordinates may be determined. In one aspect, the first set of vector coordinates may be determined for each knowledge content of the plurality of knowledge content. In one aspect, the second set of vector coordinates may be determined for a bug-query received from a user in real-time. In one aspect, the second set of vector coordinates may be determined by performing the LSI on the bug-query. In one embodiment, the first set of vector coordinates and the second set of vector coordinates may be determined based on the one or more sub-matrices. In one implementation, the first set of vector coordinates and the second set of vector coordinates may be determined by the vector coordinates identification module 218.

At block 712, a cosine similarity measure of the bug-query with each knowledge content stored in the knowledge repository 226 may be computed. In one aspect, the cosine similarity may be computed based on the first set of vector coordinates and the second set of vector coordinates and a predefined formulation. In one implementation, the cosine similarity measure of the bug-query may be computed by the similarity measure module 220.

At block 714, at least one knowledge content, from the knowledge repository 226, having the cosine similarity measure greater than a threshold value may be identified. In one implementation, the at least one knowledge content may be identified by the knowledge identification module 222.

At block 716, the at least one knowledge content may be provided to the user. In one implementation, the at least one knowledge content may be provided by the knowledge identification module 222.

Exemplary embodiments discussed above may provide certain advantages. Though not required to practice aspects of the disclosure, these advantages may include those provided by the following features.

Some embodiments enable a system and a method to provide at least one knowledge content relevant to a query received from a user.

Some embodiments enable a system and a method to rank the knowledge content and/or document, retrieved based on the query, based on the relevance and thereby provided to the user accordingly.

Although implementations for methods and systems for providing semantics based technical support to a user have been described in language specific to structural features and/or methods, it is to be understood that the appended claims are not necessarily limited to the specific features or methods described. Rather, the specific features and methods are disclosed as examples of implementations for providing the semantics based technical support to the user.

We claim:

1. A method for providing semantics based technical support to a user, the method comprising:
   extracting, by a processor, a set of keywords from a plurality of knowledge content and a plurality of bug content stored in a knowledge repository and a bug repository respectively;
   performing, by the processor, Latent Semantics Indexing (LSI) on the set of keywords, in order to index the set of keywords, wherein the set of keywords are indexed based on a set of predefined rules;
   generating, by the processor, a keyword-content matrix comprising a similarity score computed for each keyword, of the set of keywords, corresponding to each knowledge content present in the knowledge repository, wherein the similarity score indicates a frequency of occurrence pertaining to each keyword in each of the plurality of knowledge content;
   decomposing, by the processor, the keyword-content matrix into one or more sub-matrices, wherein the keyword-content matrix is decomposed based on a low-rank approximation method;
   determining, by the processor,
      a first set of vector coordinates for each knowledge content of the plurality of knowledge content, and
      a second set of vector coordinates for a bug-query received from a user in real-time, wherein the second set of vector coordinates are determined by performing the LSI on the bug-query,
   and wherein the first set of vector coordinates and the second set of vector coordinates are determined based on the one or more sub-matrices;
   computing, by the processor, a cosine similarity measure of the bug-query with each knowledge content stored in the knowledge repository, wherein the cosine similarity is computed based on the first set of vector coordinates and the second set of vector coordinates and a predefined formulation;
   identifying, by the processor, at least one knowledge content, from the knowledge repository, having the cosine similarity measure greater than a threshold value; and
   providing, by the processor, the at least one knowledge content to the user thereby providing semantics based technical support to a user.

2. The method of claim 1, wherein the set of keywords is extracted based on at least one of a frequency of occurrence, proximity between various keywords, synonyms, acronyms, and polysemy.

3. The method of claim 1, wherein the LSI is performed on the set of keywords by using one of decomposition methods including a low rank approximation method, a dimensionality reduction method, an Eigen vectors method.

4. The method of claim 1, wherein the set of predefined rules comprises use of stop words, tokenization of text, lowercasing of text, sorting of the set of keywords in alphabetical order.

5. The method of claim 1 further comprises
   maintaining, by the processor, a bug repository comprising the at least one knowledge content provided to the user corresponding to the bug-query, wherein the bug repository is maintained to provide the at least one knowledge content when a new bug-query, identical to the bug-query, is received from any user, and
   updating, by the processor, the bug repository with the at least one knowledge content provided to the user corresponding to the new bug-query, distinct from the bug-query.

6. A system for providing semantics based technical support to a user, the system comprising:
   a processor; and
   a memory coupled to the processor, wherein the processor is capable of executing a plurality of modules stored in the memory, and wherein the plurality of modules comprising:
      a keyword extraction module for extracting a set of keywords from a plurality of knowledge content and a plurality of bug content stored in a knowledge repository and a bug repository respectively;
      an indexing module for performing Latent Semantics Indexing (LSI) on the set of keywords, in order to index the set of keywords, wherein the set of keywords are indexed based on a set of predefined rules;
      a matrix generation module for
         generating a keyword-content matrix comprising a similarity score computed for each keyword, of the set of keywords, corresponding to each knowledge content present in the knowledge repository, wherein the similarity score indicates a frequency of occurrence pertaining to each keyword in each of the plurality of knowledge content;
         decomposing the keyword-content matrix into one or more sub-matrices, wherein the keyword-content matrix is decomposed based on a low-rank approximation method;
      an vector coordinates identification module for determining
         a first set of vector coordinates for each knowledge content of the plurality of knowledge content, and
         a second set of vector coordinates for a bug-query received from a user in real-time, wherein the second set of vector coordinates are identified by performing the LSI on the bug-query,
      and wherein the first set of vector coordinates and the second set of vector coordinates are identified based on the one or more sub-matrices;
      a similarity measure module for computing a cosine similarity measure of the bug-query with each knowledge content stored in the knowledge repository, wherein the cosine similarity is computed based on the first set of vector coordinates and the second set of vector coordinates and a predefined formulation;
      a knowledge identification module for
         identifying at least one knowledge content, from the knowledge repository, having the cosine similarity measure greater than a threshold value; and providing the at least one knowledge content to the user thereby providing semantics based technical support to a user.

7. The system of claim 6, wherein the set of keywords is extracted based on at least one of a frequency of occurrence, proximity between various keywords, synonyms, acronyms, and polysemy.

8. The system of claim 6, wherein the LSI is performed on the set of keywords by using one of decomposition methods including a low rank approximation method, a dimensionality reduction method, an Eigen vectors method.

9. The system of claim 6, wherein the set of predefined rules comprises use of stop words, tokenization of text, lowercasing of text, and sorting of the set of keywords in alphabetical order.

10. A non-transitory computer readable medium embodying a program executable in a computing device for providing semantics based technical support to a user, the program comprising a program code:
 a program code for extracting a set of keywords from a plurality of knowledge content and a plurality of bug content stored in a knowledge repository and a bug repository respectively;
 a program code for performing Latent Semantics Indexing (LSI) on the set of keywords, in order to index the set of keywords, wherein the set of keywords are index based on a set of predefined rules;
 a program code for generating a keyword-content matrix comprising a similarity score computed for each keyword, of the set of keywords, corresponding to each knowledge content present in the knowledge repository, wherein the similarity score indicates a frequency of occurrence pertaining to each keyword in each of the plurality of knowledge content;
 a program code for decomposing the keyword-content matrix comprising into one or more sub-matrices, wherein the keyword-content matrix is decomposed based on a low-rank approximation method;
 a program code for determining
  a first set of vector coordinates for each knowledge content of the plurality of knowledge content, and
  a second set of vector coordinates for a bug-query received from a user in real-time, wherein the second set of vector coordinates are identified by performing the LSI on the bug-query,
  and wherein the first set of vector coordinates and the second set of vector coordinates are identified based on the one or more sub-matrices;
 a program code for computing a cosine similarity measure of the bug-query with each knowledge content stored in the knowledge repository, wherein the cosine similarity is computed based on the first set of vector coordinates and the second set of vector coordinates and a predefined formulation;
 a program code for identifying at least one knowledge content, from the knowledge repository, having the cosine similarity measure greater than a threshold value; and
 a program code for providing the at least one knowledge content to the user thereby providing semantics based technical support to a user.

* * * * *